No. 745,437. PATENTED DEC. 1, 1903.
L. J. HISE.
FISH HOOK.
APPLICATION FILED APR. 24, 1903.
NO MODEL.

Witnesses
Charles Morgan.
Harry Ellis Chandlee

Inventor
L. J. HISE.
By Chandlee & Chandlee
Attorneys

No. 745,437. Patented December 1, 1903.

UNITED STATES PATENT OFFICE.

LUTHER J. HISE, OF WALDRON, ARKANSAS.

FISH-HOOK.

SPECIFICATION forming part of Letters Patent No. 745,437, dated December 1, 1903.

Application filed April 24, 1903. Serial No. 154,066. (No model.)

*To all whom it may concern:*

Be it known that I, LUTHER J. HISE, a citizen of the United States, residing at Waldron, in the county of Scott, State of Arkansas, have invented certain new and useful Improvements in Fish-Hooks; and I do hereby declare the following to be a full, clear, and exact description of the invention, such as will enable others skilled in the art to which it appertains to make and use the same.

This invention relates to fish-hooks; and it has for its object to provide a construction which will be cheap and easy of manufacture and simple in its operation and which will include hooks which may be set in spaced relation and which when a fish takes the bait will be forcibly brought together to catch the fish.

Figure 1:
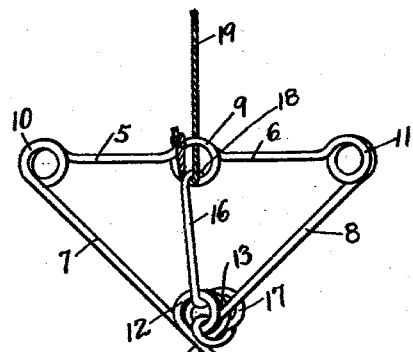
Figure 2:
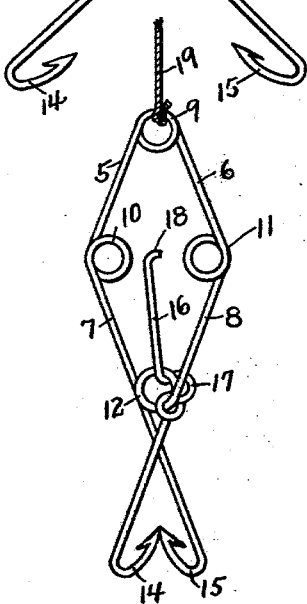
Figure 3:
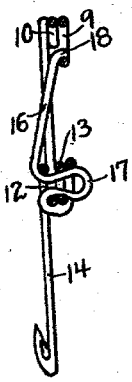

In the drawings forming a portion of this specification, and in which like numerals of reference indicate similar parts in the several views, Figure 1 is a perspective view showing the hooks set. Fig. 2 is an elevation showing the hooks sprung. Fig. 3 is a vertical section in the plane of the latch-bar, said bar being in elevation.

Referring now to the drawings, the present invention consists of a spring-wire which is bent into substantially shield shape and comprises the sides 5, 6, 7, and 8. At the point of connection of the sides 5 and 6 is formed a loop 9, other loops 10 and 11 being formed at the points of connection of the sides 5 and 7 and 6 and 8, respectively. At the opposite ends of the sides 7 and 8 from the loops 10 and 11 the wire is bent to form the two loops 12 and 13, which are overlapped or alined, and the wires are continued beyond these last-named loops and their extremities are bent to form hooks 14 and 15, which are directed toward each other, so that the hooks normally overlap slightly, the extremities of the hooks being provided with the usual barbs.

When the article is to be set ready to catch a fish, the hooks are moved apart, as shown in Fig. 1, so that the sides 5 and 6 are brought into substantial alinement, and to hold the parts in these positions a latch is provided and consists of a wire 16, having one end bent laterally and passed through the alining loops 12 and 13, the end of the laterally-bent portion being bent to form a loop 17. The opposite end of the wire or latch is bent laterally to form a finger 18, which is engaged in the loop 9. When the device is to be sprung, the finger is moved from the loop, when the tension of the spring-loops formed in the wire causes the parts to resume their normal positions, with the hooks closely overlapped. In order that the finger may be thrown out of the loop 9 when a fish pulls at the bait on either hook, the fish-line 19 is passed through the loop 9 and tied, and in setting the device the fish-line is passed beneath the finger of the latch-bar, so that when the hooks are pulled downwardly the finger will be pulled out of the loop, as will be understood.

When the device is to be thrown, as when used upon a hand-line, the line is attached to the loop at the extremity of the laterally-turned end of the latch-bar and is then passed through the loop 9.

It will be understood that in practice modifications of the specific construction shown may be made and that any suitable materials and proportions may be used for the various parts without departing from the spirit of the invention.

What is claimed is—

1. A fish-hook consisting of a wire bent into quadrilateral shape with loops at the corners thereof, two of the adjacent sides of the quadrilateral having each a loop which are alined, and the ends of the wire being continued beyond said alined loops and being bent toward each other in hook form, said wire being of spring material and adapted to stand normally with the hooks in close relation, and a latch-bar pivotally engaged with the alined loops of the wire and having a finger for engagement with the diametrically opposite loop of the quadrilateral.

2. A fish-hook consisting of a wire bent into quadrilateral shape with loops at the corners thereof, two of the adjacent sides of the quadrilateral having each a loop which are alined, and the ends of the wire being continued beyond said alined loops and being bent toward each other in hook form, said wire being of spring material and adapted to stand normally with the hooks in close relation, and a latch-bar having one end bent laterally and engaged pivotally with the alined loops of the wire and terminating in an eye, and having a lateral finger at its opposite end for engagement with the diametrically opposite loop of the quadrilateral.

In testimony whereof I affix my signature in presence of two witnesses.

LUTHER J. HISE.

Witnesses:
WILLIAM A. EVATT,
JAMES L. CENTER.